United States Patent
Tunnell et al.

(10) Patent No.: US 10,609,014 B2
(45) Date of Patent: *Mar. 31, 2020

(54) UN-PASSWORD: RISK AWARE END-TO-END MULTI-FACTOR AUTHENTICATION VIA DYNAMIC PAIRING

(71) Applicant: NXT-ID, Inc., Shelton, CT (US)

(72) Inventors: David Tunnell, Palm Bay, FL (US); Justin Mitchell, Melbourne, FL (US); Jacob Zurasky, Orlando, FL (US)

(73) Assignee: NXT-ID, INC., Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/025,992

(22) Filed: Jul. 2, 2018

(65) Prior Publication Data
US 2018/0375848 A1 Dec. 27, 2018

Related U.S. Application Data

(63) Continuation of application No. 15/068,834, filed on Mar. 14, 2016, now Pat. No. 10,015,154, which is a
(Continued)

(51) Int. Cl.
*H04L 9/32* (2006.01)
*H04L 29/06* (2006.01)
(Continued)

(52) U.S. Cl.
CPC .............. *H04L 63/08* (2013.01); *G06F 21/00* (2013.01); *H04L 9/0869* (2013.01);
(Continued)

(58) Field of Classification Search
CPC ......... H04L 63/08; H04L 9/3215; H04L 9/16; H04L 9/0869; H04L 63/18; H04L 9/0872; H04L 63/0428; G06F 21/00
(Continued)

(56) References Cited

U.S. PATENT DOCUMENTS 7,086,085 B1 * 8/2006 Brown .................... G06F 21/31
714/E11.207
8,601,588 B1 * 12/2013 Black ................... G06F 11/008
726/25
(Continued)

*Primary Examiner* — Krisna Lim
(74) *Attorney, Agent, or Firm* — Beusse, Wolter, Sanks & Maire PLLC; John L. DeAngelis

(57) ABSTRACT

A method for determining a dynamic pairing code for use in exchanging information between a first and a second communications entity. At the at the first communications entity, determining a first authentication score associated with a first information exchange session between the first and second communications entities, determining a second authentication score associated with a second information exchange session between the first and second communications entities, (the second information exchange spaced apart in time from the first information exchange), combining the first and second authentication scores to create a cumulative risk analysis score, and responsive to the cumulative risk analysis score, generating a dynamic pairing code for use in governing exchange of information during subsequent communications between the first and second communications entities.

20 Claims, 4 Drawing Sheets

Related U.S. Application Data continuation-in-part of application No. 14/217,202, filed on Mar. 17, 2014, now Pat. No. 9,407,619.

(60) Provisional application No. 61/802,681, filed on Mar. 17, 2013.

(51) Int. Cl.
*G06F 21/00* (2013.01)
*H04L 9/08* (2006.01)
*H04L 9/16* (2006.01)

(52) U.S. Cl.
CPC .............. *H04L 9/0872* (2013.01); *H04L 9/16* (2013.01); *H04L 9/3215* (2013.01); *H04L 63/18* (2013.01); *H04L 63/0428* (2013.01); *H04L 2463/082* (2013.01)

(58) Field of Classification Search
USPC ........................................................ 713/168
See application file for complete search history.

(56) References Cited

U.S. PATENT DOCUMENTS

| | | | | |
|---|---|---|---|---|
| 2008/0031447 | A1* | 2/2008 | Geshwind | H04L 9/0822 380/46 |
| 2013/0191898 | A1* | 7/2013 | Kraft | G06F 21/31 726/6 |
| 2014/0096177 | A1* | 4/2014 | Smith | H04L 63/08 726/1 |

* cited by examiner

UN-PASSWORD: RISK AWARE END-TO-END MULTI-FACTOR AUTHENTICATION VIA DYNAMIC PAIRING

CROSS REFERENCE TO RELATED APPLICATIONS

This patent application is a continuation patent application that claims priority to a U.S. patent application filed Mar. 14, 2016 and assigned application No. 15/068,834, now U.S. Pat. No. 10,015,154, issued on Jul. 3, 2018, which is a continuation patent application that claims priority to a U.S. patent application Ser. No. filed Mar. 17, 2014 and assigned application Ser. No. 14/217,202, now U.S. Pat. No. 9,407,619, issued on Aug. 2, 2016, which claims priority to a provisional patent application filed Mar. 17, 2013 and assigned Application No. 61/802,681, all of which are incorporated herein.

FIELD OF THE INVENTION

A method and system for authentication, key management, and securing data exchanged between two or more endpoints.

BACKGROUND OF THE INVENTION

Various methods have attempted to authenticate and secure communications. Most online transactions, for instance, are considered secure with assurances provided by service providers employed to protect users' data and privacy. Unfortunately, in most cases, these communications are protected with information private to a user and stored by a third-party. Recent news of compromised private data, previously considered to be secure has caused a new awareness of data vulnerability in the public sector.

Cryptographic methods to keep information shared among users, software, devices and the like, secure, are becoming more prevalent. Many judge just how secure a communication is by comparing which encryption algorithm is employed. Examples of encryption algorithms that are commercially used today include AES (Advanced Encryption Standard), Triple-DES (Data Encryption Standard), Blowfish, and RC4. Thus, the sheer number and variety of encryption methods begs the questions "which encryption is best and how much encryption is enough?"

Unfortunately, encryption alone does not ensure security and more importantly, privacy. Data that travels over "free and open" communication mediums such as cell phones and internet communications paths are grand targets for interception. Many are swayed into a false sense of security upon the pretense of their data being encrypted. Encrypting the data with a pre-existing algorithm just means that an equally outstanding algorithm is required to decrypt. Conversely, an easier method to decrypt exists: keys. Much like the keys to a home, the strength of the encryption over these insecure "free and open" communication media are only as good as the keys and the algorithms that use the keys to unlock the data. Find the key, and unlock the door.

Encryption methods: Two encryption methods are widely used today: Symmetric and Asymmetric. Both are key-based algorithms. Which method is more secure is the subject of much debate.

Symmetric cryptography: Symmetric cryptography (also know as private-key, single-key, secret-key, shared-key, and one-key encryption) exchanges "secret-keys" that are identical (or related computationally) to encrypt and decrypt data between two or more users. Types of symmetric key ciphers include block ciphers that input blocks of plaintext and stream ciphers that input individual characters. Popular examples of block cipher methods include TripleDES (Data Encryption Standard) and AES (Advanced Encryption Standard). RC4 is an example of stream cipher.

Trade-offs for Symmetric Methods: The advantages of this method are simplicity and speed. Users only have to specify a single key to encrypt or decrypt data. Symmetric cryptography is also much more resistant to brute force attacks and requires less computational power than its counterpart asymmetric cryptography. A chief issue of this method is that "secret keys" must be shared via some secret communication channel, which is the very purpose of sharing secret keys in the first place, thus presenting a "chicken-and-egg" situation. In addition, the origin and authenticity of a message cannot be guaranteed, since both users use the same key, leaving this method, like many other cryptographic methods, open to man-in-the-middle attacks. Lastly, communication with every new user requires a new key to be shared to prevent compromise of a "universal key", thereby increasing the number of keys that have to be stored securely.

Hash Functions: Another type of cryptography is cryptographic hash functions. This method enables "digital signatures" to authenticate who a message is from and whether a message has been altered. Hash functions output a short hash of fixed length that is unique to a message and its author. Hash functions have gone through many mutations, culminating in 2012 when NIST (National Institute of Standards and Technology) announced an algorithm from Keccak won a competition and will thereby be the new Secure Hash Algorithm (SHA), called SHA-3.

Asymmetric cryptography: Asymmetric cryptography is a method that enables two parties to secretly agree on a shared encryption key. Since proposed in a paper from Whitfiled Diffie and Martin Helman in 1976, the idea of cryptography using "public and private mathematically related keys", also called asymmetric, has been become widely popular, especially in online communications. Asymmetric cryptography uses two keys. One key is shared publically between users to use for encryption, while the other key is kept private to use for decryption. A public key is derived from a private key in such a way that that the private key can decrypt data encrypted from a related public key, but not vice versa. No information about a private key can be derived from a public key.

Trade-offs for Asymmetric Methods: A chief advantage of asymmetric cryptography is the reduction in the number of unique secret keys that have to be shared between users requesting to communicate. Disadvantages of this method include computational cost, slow speed, and the possibility for widespread compromise if a private key is compromised. Additionally, data may be irretrievable if a private key is lost. In addition, asymmetric encryption is far more susceptible to brute force attacks than symmetric encryption. For example, AES 256 is as strong as 15,360-bit methods using asymmetric encryption such as RSA (Rivest-Shamir-Aldemn). Last and possibly most challenging is the lack of authentication of public keys leaves the real possibility for man-in-the-middle attacks where a third party can impersonate an intended recipient by intercepting a sender's public key and exchange his or her own credentials with the sender without either the intended recipient nor the sender's knowledge.

Trusted 3rd Parties (Certificate Authorities): PKI (Public Key Infrastructure) and PGP (Pretty Good Privacy) are examples of asymmetric methods of encryption that rely upon some "trusted" authority to establish trust between peers over open communications such as the internet. These certificate authorities issue certificates that contain a public key of an entity and a cryptographic signature of the issuer, which is then passed to an intended recipient as evidence "they are who they say they are" (i.e. their "identity"). PGP and PKI differ in how they establish "trust." PKI is based upon predetermined "trusted" certificate authorities (CA) while PGP is based on a "web of trust" that allows users to choose who they trust.

Trade-offs for Certificate Authorities: Like symmetric and asymmetric cryptography, certificate authorities are vulnerable to man-in-the-middle attacks. If a certificate authority is compromised, another party can cause false certificates to be issued to impersonate another entity. For instance, in July 2012, NIST issued a warning that theft of certificates would allow attackers to issue new "valid" certificates and/or "sign" malware. Although 3rd party certificate authorities may add security in some circumstances, credibility of this method is diminished when reports of compromise surface. New methods such as certificate pinning makes man-in-the-middle attacks more difficult, but it can still be bypassed in many ways. Under this architecture, if the certificates are compromised, likely so are all sessions that utilize the certificates and their associated keys.

HTTPS and SSL/TLS: Several methods to improve cryptography as a means of mutual authentication include asymmetric/symmetric combinations, such as SSL and TLS, where symmetric private keys are shared within the encryption by public keys. PKI is the basis of SSL/TLS (secure socket layer/transport layer security), which is the "padlock" used by https (hyperText transfer protocol secure), an application layer protocol widely considered to be the cornerstone of all online secure transactions. HTTPS also supports non-repudiation of messages via another cryptographic method called digital signatures, also called "cryptographic hash functions." Symmetric methods still have the issue of a "shared" secrets between entities. It has also been shown that a private key becomes more susceptible to disclosure the longer it is used with a public key (PKI). SSL/TLS overcomes the weaknesses of authentication with PKI by using Certificate Authorities to certify the identity of a server or entity, and then overcomes the weaknesses of the speed computational expense of PKI by negotiating a temporary symmetric key for rapid encryption and decryption during a communication session.

Issues with SSL/TLS: Unfortunately, as of 2013, SSL/TLS, and thus HTTPS, is known to have some weaknesses. Some of these issues have been verified to be due to improper coding, as in the case of GnuTLS which had a bug in the code that neglected to correctly handle errors during TLS certificate (X.509 certificate) verification, similar to "goto fail" flaw in Apple's iOS and OS X operating system that left users at risk for surreptitious eavesdropping. Others are a result of using weaker symmetric methods for TLS such as RC4 within a hybrid asymmetric/symmetric implementation. For a time, RC4 was the most widely used stream cipher used within TLS (Transport Layer Security), which is the foundation of most security methods over internet and WEP (Wired Equivalent Privacy). RC4 is particularly vulnerable when non-random or related keys are used, or when the beginning of the output key-stream is not discarded.

Other Approaches: Several methods to improve cryptography as a means of mutual authentication include asymmetric/symmetric combinations, such as SSL and TLS, where symmetric private keys are shared within encryption by public keys. These methods still have the issue of a shared secret between entities. It has also been shown that a private key becomes more susceptible to disclosure the longer it is used with a public key (PKI). SSL/TLS overcomes the weaknesses of authentication with PKI by using Certificate Authorities to certify the identity of a server or entity, and then overcomes the weaknesses of the speed computational expense of PKI by negotiating a temporary symmetric key for rapid encryption and decryption during a communication session. This approach places emphasis on signature process with certification authorities, which also has weaknesses as previously discussed.

Regardless of the cryptographic method used for encryption or authentication, an approach that ensures entities "are who they say they are" is needed for various scenarios, for example, where a device falls into the hands of an unauthorized user. For such instances, methods such as biometrics have been promoted.

Biometrics: The same principle of key management for encryption also holds true for authentication. Authenticating methods that validate "you are who you say you are" typically utilize biometric features that uniquely identify an individual from any other individual. Unfortunately, like encryption keys, a biometric key is just another key that, if compromised, may provide a false sense of security. Furthermore, many implementations send biometric data along with other keys to authentication servers, traversing communication paths with limited security, leave the biometric sample open to interception. In addition, the widespread collection of biometric templates by governments and private companies alike, both whose custodianship has been brought into question as of late, further increases the chances of unauthorized access. Again, the same principle for exchanging encryption keys applies to exchange of authentication keys: Find the key, and unlock the door.

Multi-Factor Authentication: One approach that improves authentication is multi-factor authentication (MFA). MFA requires 2 or more factors to authenticate. Authentication factors generally consist of:

Knowledge—"something you know"
Possession—"something you have"
Biometrics—"someone you are"

Knowledge factors include passwords (secret words or phrases), PIN (personal identification number), and patterns (sequence(s) of cells). Possession factors include tokens (FOB, USB, contactless RFID, and the like), smart cards, etc. Biometric factors are typical biometric identifiers such as finger, face, voice and IRIS, among others.

Other Prior Art: Other approaches to improve authentication and key management include an approach offered by Herzber, et al., which builds on threshold cryptography by spreading out parts of a key over several entities in order to protect against any single point failure and reduce the probability of attack. This method assumes security is robust in multiple locations, which may prove challenging in some configurations. Methods involving double encryption where messages can be encrypted and decrypted with combinations of a sender's and an intended recipient's public and private key pair could yield disastrous consequences if one key is compromised.

Other approaches that involve using a central authentication server to forward authenticated messages further increase latency and introduce yet another potential failure point by adding another step in the process. Yet other approaches attempt to use a common clock to synchronize both sides with an additional secret being time. Halevi and Krawczyk explore another asymmetric method that leverages an authentication server to hold private keys for entities and use its own public key to authenticate passwords from the entities. Similar prior art is offered where the entity and authentication server authenticate each other with public/private key pairs, but such approaches are still susceptible to man-in-the-middle attacks. Boyarsky leverages the approaches offered from Halevi and Krawczyk to propose a method where an authentication server signs a user's session key with the server's public key. This system utilizes one-time private and public keys performed on one entity's user password. Other new password related methods include single sign-on (SSO) methods such as BYOI (bring your own identity), where authentication is based upon existing social identities, such as Facebook, Twitter and the like, which lowers administrative overhead, but at a higher risk of identity theft. Token-based methods may also include protocols such as but not limited to one-time passcodes/passwords (OTP), public-key infrastructure (PKI) and single sign-on (SSO) methods. Issues with these methods include synchronization, certificate authorities, and integration that may make implementation unattractive.

New Methods: Which cryptographic authentication and encryption method is more secure is the subject of much debate. Regardless of the encryption method, the issue with encryption is that the keys still must be protected. Compromise of a private key, though unlikely, could prove catastrophic. Whether disclosure is a result of flawed implementations or a flawed protocol or architecture, recent disclosures of private data bring into focus the need for some new approaches to guarantee authenticity and place control of data into the hands of the user to control his or her own secrets, keys, and private data.

SUMMARY OF THE INVENTION

The present invention is an approach to authenticate and encrypt communications through a method of secure dynamic pairing of devices, applications, services, software, firmware, servers and the like, referenced herein as "endpoints." This method introduces specially encrypted dynamic pairing codes, meant to address the shortcomings of asymmetric, symmetric and signature cryptography, while leveraging the benefits of each.

Dynamic pairing codes are derived from a proprietary risk analysis algorithm that produces authentication scores used in combination with one another to form a combined risk analysis score from which the dynamic pairing codes are generated. This algorithm utilizes multiple user and device identifiers to calculate a new authentication score for the current authentication session. Under this invention, methods to bind these unique identifiers to multiple endpoints are offered to establish "trust" between endpoints. Identifiers that uniquely identify a user with a device may also be used to bind with other devices, devices with firmware or software, and so on, or any combination thereof, via authenticators that test identity. Location data, user behavior, transactions, biometrics and the like are non-limiting examples of identifiers that may be used to achieve a "circle of trust" that determine the access level of a user among endpoints. Rather than blindly trusting a certificate from a third party certificate authority, trust, according to this method, is earned by the number of successful authentications achieved over time.

BRIEF DESCRIPTION OF THE DRAWINGS

The forgoing and other features of the present invention will be apparent to one skilled in the art to which the present invention relates upon consideration of the description of the invention with reference to the accompanying drawings, herein.

DETAILED DESCRIPTION OF THE INVENTION AND ITS EMBODIMENTS

Figure 1:
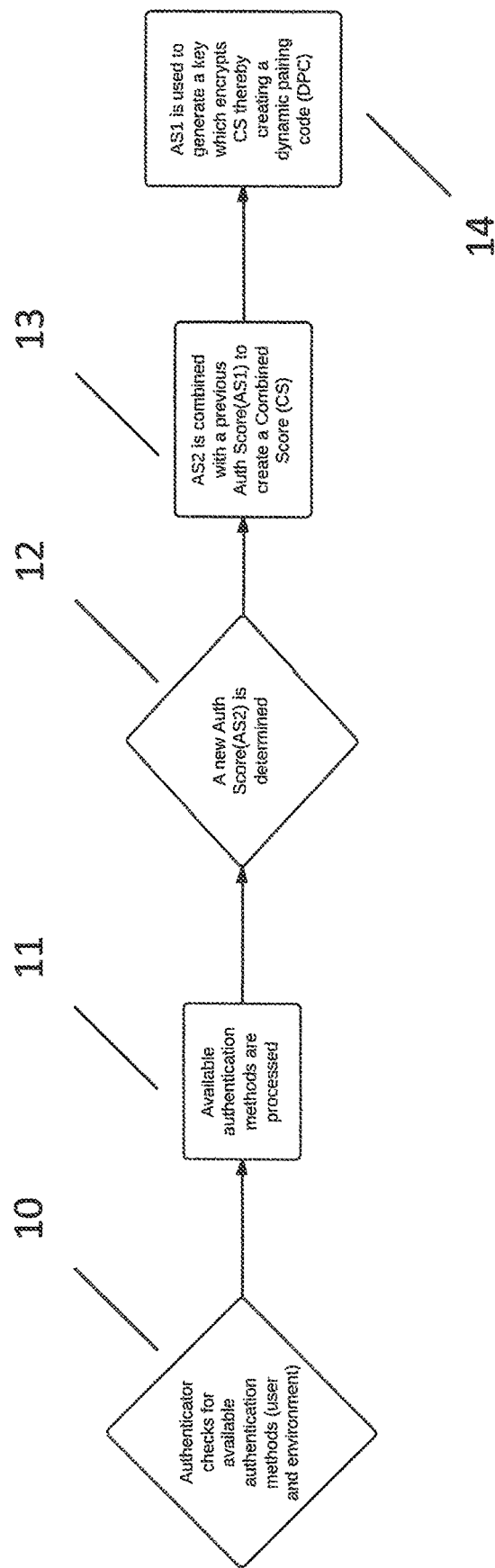
FIG. 1 illustrates a flowchart of a universal authentication and data exchange process between two or more entities, e.g., an authenticator and an endpoint, using risk analysis to generate authentication scores used within a key generator to derive dynamic pairing codes.

The primary objective of the present invention is to enable devices, endpoints and other entities to authenticate and communicate with one another using risk-aware methods. The present invention provides a method to bind unique identifiers to endpoints to establish trust and "inter-awareness". These identifiers are challenged by authentication methods that yield authentication scores utilized by endpoints and authenticators to characterize risk. Authentication scores are derived from various parameters regarding the usage, behavior, quality and fused results of all authentication methods used by the authenticator in the authentication event. Authentication scores calculated during an authentication session are combined with previous session authentication scores to establish a "dynamic pairing code" thereby embedding multiple authentication scores that define the overall risk of a specific session within a single data point. The endpoint knows every authenticator paired with it and recognizes that a dynamic pairing code belongs to a specific authenticator, thereby allowing the endpoint to select an appropriate encrypting/decrypting code.

Dynamic Pairing Overview: In one embodiment, dynamic pairing codes (DPC) are made up of a combination of two or more sessions' authentication scores, then encrypted with a special encryption key. Via the combination of more than one previous score and a new score such as but not limited to multiple past scores, trust is increased. In turn, more authentications will yield more trust as more scores are being utilized in the dynamic pairing process. The DPC is a complex polynomial of varying size and complexity and both authenticator and endpoint are aware of the algorithm that determines that polynomial such that other information and the score can be recovered from the polynomial. A previous session's authentication score, likewise known to both authenticator and endpoint, may be used as a "seed" value input to a key generator, with other information such as but not limited to a pseudo-random number, to create the current session's encryption key.

In some embodiments the dynamic pairing code (DPC) may then be optionally encrypted once again, for example by using a symmetric or an asymmetric code and/or other cryptography techniques that use combinations of public keys, shared symmetric keys and/or certificates. Encryption/decryption techniques may also be used as supplementary authentication techniques for endpoints (and midpoints between endpoints). Endpoint(s) then decrypt the multiple encryption layers as applied to the dynamic pairing code, and decrypt once again using the previous session's authentication score. This process yields the current authentication score without actually sending the current authentication score from the authenticator to an endpoint.

In this embodiment, the new authentication score is masked within the combination of two or more authentication scores. It is a dynamic "shared secret" that is never revealed, hidden from any possible intercept. Common hacking methods such as a brute force attack would not impact this invention due to its inherent reliance upon risk analysis, which is dynamic per each session. As soon as any invalid attempts are made to decrypt the dynamic pairing code, the endpoint's cumulative risk score would be increased and additional user identification is requested per additional authentication methods. Other common spoofing techniques involving such methods as finding a common denominator among a group of similar keys would also not apply to the present invention due to the dynamic nature of the keys (seeds) and lack of publically shared secrets (identifiers).

Furthermore, "man-in-the-middle" attacks do not impact the integrity of the encrypted data due to the requirement for additional information to decrypt, where only one endpoint device holds that information. Preferably only one endpoint knows the new authentication score for the current session. The other endpoint derives this value from the decrypted combined authentication score. Thus the current session authentication score is never sent between the endpoints engaged in the data exchange. The dynamic pairing code, since it has risk information within its derivation, may communicate additional information, such as but not limited to credentials, access levels and/or circles of access.

In another embodiment, additional security may be provided by utilizing a midpoint, such as but not limited to a physical device such as a door knob, a virtual secure element, server or the like, that acts as a filter or firewall to thwart potential attacks by adding an authentication step between the two endpoints by using a variety of methods that validate that each endpoint is real and authorized to act on behalf of a user or system identity.

An endpoint may choose which circle of access to accept another endpoint or authenticator into, or make this decision based on the authentication score from another trusted endpoint, midpoint, or authentication service. Rather than a "certificate" requiring some lengthy process with an unknown third party, a risk score may be used that includes a measure of an endpoint's probability of authenticity derived from the history of successful and unsuccessful access attempts. In addition, an endpoint's circle of access is periodically revalidated as part of the dynamic pairing code update process to determine if the endpoint's authentication score has changed.

Hidden Private Information: A major advantage with this method is that all identifiers and keys are managed by the user within his or her personal vault, not by some administrator unknown to the user, but the identifiers and keys are still bound to endpoints through risk analysis to achieve trust. In fact, no keys are even held; instead they are dynamically derived from dynamic pairing codes, which are in turn derived from authentications scores, which are derived from identifiers, some of which are likewise dynamic.

No identifiers such as biometric keys, device identifiers and the like are ever revealed in the open, making interception pointless to an attacker. User secrets, such as biometric keys and templates, are always safe under this invention, with distribution of only derived codes under full control of the owner. Thus, under this invention, all private data is kept private, hidden from any exposure to attack, and under a user's control, while building trust between entities and endpoints based on risk analysis.

Non-limiting Application Examples: This invention applies to numerous applications that use devices to authenticate and access other midpoints and/or endpoints, online or offline; devices that do not require an operating system and devices that require an operating system. The system and method of the invention are not limited to any specific software and/or hardware, and may utilize any authenticator that is used to authenticate "entities", defined as users, devices, applications, services, servers, software and the like, to other entities.

For a non-limiting example, a key used for standard door locks, which acts as an authenticator, may communicate to a keyhole, which acts as a midpoint, and a locking mechanism, which acts as an endpoint. The key is used to access the lock, but not without the midpoint recognizing first and the lock authenticating. If a new set of keys or a new method is introduced, both keys have to be recognized as valid with the midpoint (key-hole). Once they both recognize they share that common peer, they can establish a peer-to-peer (P2P) connection between themselves to exchange identifiers. In the same way, as another non-limiting example, a smart wallet, acting as an authenticator, may authenticate to an authentication server, acting as a midpoint, and also authenticate with a bank, acting as an endpoint.

Identity Inter-awareness: In most embodiments, entities such as electronics, applications, services and the like that authenticate with some authenticators represent a user, group, company or another "identity" to other endpoints. Likewise, it is a reasonable expectation that some form of identity should be instantiated into electronics so that users and other entities may know with whom they are communicating. Furthermore, it is desirable for electronics to have "inter-awareness" of what information should and should not be shared to specific entities. This inter-awareness should mimic the natural "circles of access" that each entity naturally allows in normal operation. For instance, if a user is purchasing a product from a retailer, that user wants to know that it is the retailer who is receiving his or her money. Conversely, the retailer has a reasonable expectation to know users are who they say they are. Thus, entities must be inter-aware of the identity of who is accessing them and the risk involved with granting them access to various services.

Identifiers: The present invention secures mobile and computer communications over any communication medium using dynamic pairing codes that are generated from a combination of random numbers and seeds. Previous sessions' authentication scores known to both parties may be used as "seed" values to generate special encryption keys to encrypt the dynamic pairing codes. Authentication scores are derived from one or more authentication methods using an algorithm that considers various parameters used to compare to identifiers. In this invention, authenticators check environment variables and user variables to determine which authentication methods are available to process identifiers in calculating authentication scores.

Identifiers include, but are not limited to: biometrics e.g., voice, speaker, repeated word, gesture, gate, face, 3D face, IRIS, finger, eye, eye vein, eye tracking, gesture, DNA, vein, palm, heartbeat, vibrometry, and scent; secrets, e.g., PINs, passwords, patterns, gestures, touch gestures, user defined actions and/or dynamic user sequences; behaviors, e.g., previous invalid authentication attempts, input speed, input style, habits, sites visited, movements, gestures, and interface actions such as canceling input or deleting characters;

devices, e.g., any method to uniquely identify a device, a unique internal serial number, MAC address, CRC, wallet ID, and unique device metrics such as vibrometry and/or electrical noise; a proximity sensor, e.g., two or more devices dynamically paired with one or more other specific entities requiring authentication with one another prior to enabling access to certain circles of access and/or other entities; groups, e.g., one or more groups a user belong to; locations, e.g., location, fence and/or proximity; one-time codes, e.g., a random number; sessions and/or transactions of any transaction parameters permitted by a user to be performed with the account, such as single transaction limit, total limit, transaction type, and time of transaction; firmware and/or software digest and signature that ensures firmware and software cannot be replaced; account identifiers, e.g. aliases to accounts, account numbers, wallet ID, user customizable card names, card type, CVV, charge limits and time duration; user credentials.

"Secure as you go" Unpasswords: Other identifiers include newer "Secure as you go . . . " unpassword technologies can authenticate a user passively, without requiring traditional passwords to access some device or account, or lengthy delays, body parts, size, power and other aspects of authentication that is useless to the user experience.

In addition, the environment plays a factor in authentication. For example, voice recognition is impractical for noisy environments and finger is impractical where gloves are often worn. Thus, this invention will also sense the environment to determine the best authentication modality to use for a given authentication event.

Dynamic pairing supports various unpasswords authenticator methods including but not limited to sight word, sound word, passive voice, face password, blink recognition, user definable sequences such as most common buttons and/or applications initially used, approximation sequences such as images, doodle, gestures and typing patterns, soundpass, musicpass, tunepass, litepass, lightpass, dynamic user define sequences such as patterns that change moving images, game and sport ninja unpassword gestures, and the like.

Binding Authenticators to Endpoints through Authentication Identifiers: Initial entry of a user (or another endpoint) into a system of other midpoints and endpoints typically requires some authentication to ensure users are "who they say they are." Conversely, endpoints frequently need to authenticate with users (or other endpoints). Entities, such as but not limited to users, devices, software, firmware, locations and the like may all have "identifiers" associated with them, such as but not limited to the aforementioned identifiers, that enable access derived from challenges or tests from devices, sensors, software and the like, referenced hereafter as "authentication sensors." Authenticators thereby become identity access management (IAM) devices that may integrate with one or more authentication sensors, which may be local to the authenticator, or hosted by another device or entity. Initial authentication establishes access levels, referenced hereafter as "circles of access", that are granted to a user or endpoint that sufficiently satisfies tests by authenticators. Increased circles of access may be granted to a user, but usually require more, and preferably different, authentication sensors. Since authentication sensors that are used to authenticate identity can change over time, this invention binds each authentication event, and thus identifiers associated with each authentication event, to an authentication score, such that endpoints may be "inter-aware" of identities without revealing actual identifiers. Authentication scores are then encoded into a dynamic pairing code that can be used by endpoints for authentication, authentication risk, encryption, credentials, access levels and/or circles of access. In this way, dynamic pairing binds entities, such as users, endpoints and the like, to identifiers through authentication risk assessment and finally to dynamic pairing codes, that can then be used by endpoints to govern circles of access to other endpoints, services and the like, achieving risk aware, end-to-end multi-factor authentication.

Method to assess Risk using Authentication Scores: When a user attempts to access an endpoint, an authentication score is calculated. Each score is a measure of "are you who you say are" based on some identifier or set of identifiers. For each authentication attempt, otherwise known as access session, this authentication score is calculated from various access parameters and continually updates a cumulative risk score at the endpoint. Non-limiting examples of these parameters include various methods and/or models that define the access such as but not limited to: usage that describes when and where access is attempted, such as but not limited to the time of day, interval of access, location (geographic and/or virtual), originating IP address and/or range of IP addresses and/or range of open ports, browser, and/or hardware identifiers such as but not limited to electronic serial number, MAC (media access control), CRC (cyclic redundancy check), etc.; behavior that describes how access is attempted such as but not limited to invalid attempts, input speed, input style, habits, sites visited, movements, gestures and/or interface actions such as but not limited to canceling input or deleting characters; quality of collection that describes the authentication method and/or sensors used that considers but is not limited to the type of identifier, strength of the sample, "liveness." test result, etc.; fused results of each attempt in terms including but not limited to a probability score compared to a threshold for each authentication modality used in the access.

The endpoint's cumulative risk score takes into account historical occurrences of attempted access and methods of those attempts in order to determine if this user is the same user who previously accessed. Unlike other methods such as identity risk scores that are calculated by a server as described in WO 2014004412 A1, the present invention calculates authentication scores client-side at the authenticators where authentication entry is made and identifiers and credentials can be better protected. Furthermore, this method will detect anomalies, such as but not limited to whether "Password" was typed versus "password", "1234" versus "1235", or a 50% score on a voice match versus 98% previously.

Dynamic Pairing Handshake: The value of this invention is that no handshake per se is required. The endpoint receiving the encrypted combined dynamic pairing code either is able to decrypt it and resolve the new authentication score, or not. If it decrypts successfully, both sides immediately communicate based on the dynamic pairing code, or authentication is rejected. Thus, each endpoint immediately knows that the other is authenticated with a single communication. In another embodiment, the authentication is bi-directional, such that the receiving endpoint validates with the sending endpoint (authenticator) via dynamic pairing as well as vice versa.

Other Embodiments

Session Key Options: The invention described heretofore suggests encryption using a new authentication score derived from the dynamic pairing code as the encryption key for the current session. In another embodiment, another single symmetric key may be used for encryption of the session. In another embodiment, two public keys may be used for encryption, one from each endpoint, while each endpoint may still utilize its own private key for decryption. In yet another embodiment, the authentication score from a previous session may be used for encryption in one direction (i.e. endpoint 1 to endpoint 2), while another previous or new authentication score may be used for encryption/decryption in the other direction (i.e. endpoint 2 to endpoint 1). In yet another embodiment, an authentication score and/or dynamic pairing code from the previous session, new session, and/or some combination may be used for encryption in one direction or all directions. In another embodiment, information within the dynamic pairing code dictates which keys are to be used for encryption.

Added Encryption: In some embodiments, asymmetric, symmetric and/or other encryption may be added to increase layers of encryption during the authentication process.

Integration with Other Protocols: In some embodiments, the dynamic paring method may integrate with other protocols, such as but not limited to SSL/TLS, HTTPS and HSTS (http strict transport security), to add significant security and/or information and services to these protocols.

Additional Features: Other endpoints achieve "inter-awareness" of authentication risk, and thus identifiers, through the act of dynamic pairing. In some embodiments, this dynamic pairing method may also manage one or all of the following, depending on specific implementation:

Establishment or recommencement of secure sessions
Dynamic authentication score
Cipher suite negotiation
Compression suite negotiation
Circle of Access
Dynamic pairing code exchange Additional Information and Services: The invention described herein enables endpoints to authenticate with one another using a novel past, present and future methodology wherein a new authentication score (i.e. the future) is masked by combining it with a previous authentication score (i.e. the past) and that value is then encrypted. The previous authentication score is used as a seed to determine a dynamic pairing code (i.e., the present) via a pseudo-random number generator or equivalent. In other embodiments, other information and/or services may be also encoded with the method such as but not limited to session ID, list of ciphers, list of compression, which cipher to use, which compression algorithm to use, which encryption key to use, which encryption key to use for transmit, and which to use for receive, one or more encryption keys, circle of access and/or access level, which communications channel to use for transmit, which communications channel to use for receive, and/or a one-time pairing code from trusted source such as an authentication server or trusted third party.

Establishing Trust—Initial Pairing Methods

In instances where products are pairing for the first time, the following describes non-limiting examples of methods to initially configure and pair endpoints. This process describes one embodiment that includes tamper-proof hardware. Those well versed in the art will recognize that these methods can be performed in a purely software embodiments of the invention as well hardware embodiments.

Pyramid of Trust, Circles of Access: The pyramid of trust is a method that determines trust, based upon cumulative risk scores. The invention introduces a method to support multiple levels or circles of access based on cumulative risk that is derived from how, when and/or where a user has accessed various endpoints. As users successfully access and interact with entities, their trust becomes stronger. Conversely, trust becomes weaker as unsuccessful attempts occur over time, requiring the user to verify more identifiers. As risk seeds are sent to a midpoint, endpoint, and/or authentication service, the pyramid of trust governs the cumulative risk score. Each level in the pyramid corresponds to a circle of access that governs access for that endpoint, midpoint, or service. Circles of access are defined by natural workflows derived from various characteristics of an individual, such as but not limited to job description, group membership, employee status, title, job description, etc.

Non-limiting examples of how the pyramid of trust may work include biometric authentication methods. A DNA verification score, for example, might yield a higher weight than a fingerprint, thus moving up the pyramid of trust. Likewise, a weaker password might be considered at a much lower weight than any biometric. Two individuals that share a common temporary pairing code might yield a higher weight than any of these, and a method where two or more devices are "pre-paired" might yield the highest weight of all, given there is no chance the two devices don't "know" each other. These and other parameters are all considered within the complex calculation of an overall authentication score, which is governed by the pyramid of trust.

Establishing Trust using Pre-Paired Endpoints: In many applications, service or application providers may wish to deploy two or more entities together, at the same time. For such applications, entities such as devices, servers, software, services and the like can be "pre-paired" with each other prior to delivery to "bind" one to another. In such instances, adding temporary pairing codes achieves pre-pairing.

This method of pre-pairing endpoints enables non-limiting examples of individuals, government and commercial businesses, such as banks, retailers, identification authorities and the like, to bind accounts, products, services and the like with dynamically paired products delivered to a user. This avoids the need for certification authorities enabling service providers to provide a specific product pre-paired with their internal authentication systems that are guaranteed to remain secure while user identities are programmed during the initial set-up process.

Establishing Trust using One-Time Temporary Pairing Codes: Another method to establish trust with the initial authenticity uses a one-time pairing code that is entered by both (or all) entities being paired. In this embodiment, a one-time pairing code is a true random number generated by one or more of the endpoints and provided to the other endpoints. Each endpoint enters the temporary pairing code, which is then used to derive common initial authentication score within each endpoint. This authentication score is then dynamically changed as endpoints access one another per the dynamic pairing process.

This method also enables non-limiting examples of individuals, government and commercial businesses to bind accounts, products, services and the like with dynamically paired products when physically present with another endpoint or authenticator. Alternatively, one-time pairing codes may be passed via other communications, such as but not limited to voice, text, email, mail, a midpoint or peer-to-peer communications, or combinations thereof.

Methods to Increase Trust: In some embodiments, trust may be increased by sending the temporary paring code via some other communications channel that ensures a human will be involved in typing in the code into the authenticator. Trust is further increased if the communication channel is already known to the endpoint without the endpoint providing it, such as email or phone number. Typing in a common code improves the authentication score on the pyramid of trust because the code was received via another communications channel and a human was involved in typing in the pairing code, thereby accomplishing a "liveness" test and assuming some interaction between live users. For instance, a one-time temporary pairing code may be communicated to the other party via a variety of other communication channels including voice (via face-to-face or phone), text (via cell phone), and/or email (via laptop or other computer). A voice communication would receive a higher authentication score than say an email, since voice would indicate the interaction between two live humans to transfer the code.

Establishing Trust using Midpoints or other Endpoints: Another embodiment establishes trust via a trusted third party, such as a trusted midpoint or endpoint. This method may also be used in combination with the aforementioned pyramid of trust. Under this invention, two or more entities wishing to dynamically pair with one another simply send an invitation code to the authentication midpoint via an encrypted communication. Since both entities are already dynamically paired with the authentication midpoint, attacks such as man-in-the-middle are not at risk, and response from the authentication midpoint can thus be trusted. In addition, midpoints may also be used to prevent denial of service attacks at the endpoint level. Since the midpoint directs the flow of traffic and determines if an endpoint has been identified correctly or not, a denial of service attack would be brought upon the midpoint, instead of the much more important endpoint. Such midpoint could then re-route the traffic to a secondary or backup midpoint to allow the authentication to continue uninterrupted.

Establishing Trust via an Authentication Service: In some embodiments, the authentication score is sent to an authentication service (midpoint or server) that is also dynamically paired with each endpoint wishing to authenticate. In one embodiment, a new dynamic pairing code is sent by each of the endpoints every time an authentication is performed by an endpoint so that the authentication service has "inter-awareness" of the client all times. In another embodiment, each endpoint may ask the service if it knows the other endpoint, in which the service responds with a risk seed. Since the authentication service may have a longer history with a given endpoint, it may be able to establish higher level of trust. In another embodiment, the server decrypts and compares the received dynamic pairing code to a threshold and assigns a risk value based on a pyramid of trust and reports that to the other client.

Establishing Trust via Peer-to-Peer (P2P): In this embodiment, a peer-to-peer (P2P) connection can be established between two or more midpoints or endpoints by utilizing the shared knowledge of an authentication midpoint. Under this embodiment, instead of a certification authority validating the two entities, which could be compromised, the two entities validate each other under the shared trust given by the authentication midpoint. An endpoint may choose what level to accept the other endpoint in its circle of access, or to deny the invitation. The actual pairing is performed P2P, after both entities "find" each other and realize they can trust each other.

Fixed Identifiers: For embodiments that include a tamper-proof IC (recommended), the following permanent initial identifiers are internally generated from within the IC such that they are never exposed at any time.

Device Serial Number (permanent)
Master Reset Key (permanent)
Initial Firmware Authentication Key (dynamic)
Initial Encryption Key (dynamic)
Account (Optional)
Wallet Identifier (Optional)
Initial Pairing Key (dynamic)

These identifiers may be programmed by the factory when a device is fabricated, or optionally as a user sets-up the device for the first time. Once complete, all permanent fixed identifiers are locked so that they cannot be externally read, written, modified, copied, or probed. The initial pairing code is not locked, and may physically embedded on two or more physically present endpoints.

Optionally Pair Firmware and/or Software: An endpoint can be paired with its firmware and/or software to ensure no tampering. The first step in this process is to take a "digest" (firmware identifier) of the firmware. Next, an encrypted "signature" is derived from the dynamic pairing algorithm. This signature can be written internally to the tamper-proof IC, or because it is encrypted, it can be saved to external memory. A "secure boot" can be achieved by comparing a new digest of the firmware to the saved digest within the encrypted signature. If the digests match, boot continues. Thus, a secure boot is achieved with confidence that the firmware has not been altered in any way.

Optional Pair Proximity sensors: Under another embodiment, two devices are dynamically paired with one other, such as smart wallets, smart cards, dongles or other wearable or portable devices that are naturally always present with the user. This enables one authenticator endpoint to act as a back-up to the other, while also spreading out identifiers, in some embodiments, across multiple authenticators. In another embodiment, two or more authenticator endpoints may act as a proximity sensor to the other(s) to improve security, such that both devices must be present in order to achieve access. Note one well versed in the art will recognize that any device may be configured with specific identifiers to a user, but it is advantageous to secure these identifiers within a anti-tamper device with countermeasures to any attempt to hacking.

Dynamic Pairing Use Within Payment Industry: In another embodiment dynamic pairing may take place inside of a payment card, token, transaction, or other method. The present invention may be used to secure payment details as well as authorize a transaction. Furthermore, the present invention provides a method to hide the transaction details such as the card number or security code from the POS (point of sale) system to prevent private data from being stored or stolen. A tokenization method can be used within dynamic pairing such that the seed that encrypts the dynamic code also dynamically generates account details as well. Authentication scores may also be used to determine risk for a current transaction. Endpoints may have dynamic risk score thresholds dependent upon various variables such as location, transaction amount, transaction type, and transaction frequencies. Therefore, dynamic pairing provides a method by which certain transaction may be declined based upon the risk associated with that transaction as governed by the endpoint. Certain transactions may require higher authentication scores or specific authentication methods.

Dynamic Pairing using Symmetric Identifiers: Some applications may want, or already have, common identifiers on both sides of a communication link. Non-limiting examples of such applications include identification devices issued by banks, employers, governments, schools and the like. Under this embodiment, dynamic codes are generated from combinations of one or more unique identifiers and/or keys that are specific to factors including but not limited to users, devices, accounts, locations and/or sessions or transactions. Non-limiting examples of identifiers that may be used within this dynamic pairing method include biometrics, proximity sensors, user "secrets", wallet ID, master encryption key, user customizable card names, card type, device serial number, vibrometry ID, electrical noise ID, CRC, MAC address, CVV, charge limits and time duration. In some embodiments, a high-quality random number generator, Identifiers, embedded key generator, and comparator are all safely hidden within the tamper-proof crypto chip at all times. Even the proprietary dynamic pairing code algorithm used to generate the dynamic pairing codes may be stored in a tamper-proof crypto chip as well, so that no information is ever available to be hacked.

The algorithm that generates the dynamic pairing code uses different combinations of these identifiers during different data sequences or at different time instances in combination with a high quality random number generator local on the same protected crypto chip so that identifiers saved on the device are never externally accessible. The combination of which identifiers are used and when they are used is based upon a proprietary NXT-ID (assignee of the present invention) algorithm. Thus, only the generated random number and its response are ever shared between the first and second devices.

Challenge/response methods of authentication such as this method of dynamic pairing with symmetric identifiers have a distinct advantage by passing only pseudorandom numbers, without revealing any identifiers or keys. Furthermore, having the pseudorandom number generator, comparator and the key generator within the same tamperproof device that also holds the identifiers ensures all secrets are kept secure during authentication and encryption key generation.

Multi-planar, Multi-Purpose Tunable Antenna Method: In yet other embodiments, this invention may integrate one or more multi-band and/or broadband antennas 136 (see FIG. 4) to support various communication applications. In some embodiments, this antenna 136 may consist of a miniature multi-planar, multi-purpose tunable antenna 136 that serves multiple purposes. These unique "frequency agile" antennas 136 support a wide variety of RF (radio frequency) communication methods by dynamically "tuning" to optimize to specific frequencies, such as but not limited to RFID (Radio Frequency Identification), NFC (Near Field Communication), and Bluetooth and/or BTLE (Bluetooth Low Energy).

These dynamically tunable antenna structures 136 are also used for inductive and magnetic applications as well as RF. These applications include such as but not limited to remote wake-up, proximity sensor, magnetic antenna, dynamic card emulation, and inductive charging, as well as RF applications such as Bluetooth, NFC, RFID, and secure communications.

This antenna 136 may also act as a dynamic magnetic stripe module such as described in co-owned and related patent application Ser. No. 14/049,175 filed on Oct. 8, 2013 and entitled Method for Replacing Traditional Payment and Identity Management Systems and Components to Provide Additional Security and a System Implementing Said Method, and as described in co-owned and related patent application filed on Mar. 17, 2014 and entitled "Universal Authentication and Data Exchange Method, System and Service."

An antenna 136 can be embedded within a smart or powered card and/or smart wallet that are dynamically paired to one another through the multi-planar, multi-purpose antenna to pass secure information, as a non-limiting example. Under this embodiment, these tunable antennas 136, along with associated circuitry, may serve multiple purposes including wake-up of a powered card, dynamic pairing authentication and/or data exchange between the smart wallet and card. On the card, the antenna 136 may then be used to receive data from an authenticated smart wallet, detect a reader, exchange data between the card and reader, zeroize the card to make it "dumb" again, communicate other information such as but not limited to battery level and recharge its battery by receiving power from the smart wallet or other device via inductive charging.

Wocket Number: In the above example, a private electronic vault, or smart wallet such as a wocket, may be may use a one-time "wocket number", a dynamic pairing code derivation generated by the smart wallet and/or the smart/ powered card from authentication scores derived from identifiers on one or either devices. This code may include private information from the vault or the card, such as but not limited to aliases to accounts, locations, biometrics, account numbers, names, CVC, expiration date and the like. The location, biometric and other information may be used by the smart wallet and/or card in the account selection process and/or as part of the dynamic code generation. The vault may then send encrypted data to the second device via encrypted link, where the encrypted data is decrypted via its one-time-use encryption key and then sent by the second device via the appropriate transaction method of the point of sale (POS) system. If the transaction method is a common point of sale (POS) that utilizes magnetic stripe techniques, the second device may consist of a powered card with a dynamic multi-planar, multi-purpose tunable antenna 136. Thus, the second device could act as a conduit to support virtually any method of payment or communications.

FIG. 1 illustrates a flowchart according to one embodiment of the present invention. At step 10, an authenticator determines available authentication methods and schemes and at step 11 processes any available authentication methods. At step 12, a new authentication score (AS2) is determined and combined with a previous authentication score (AS1 in this example) at step 13. The resulting score is referred to as a combined score CS. Alternatively, other previous scores or combinations thereof may also be used, in certain embodiments, in combination with a new authentication score to calculate a combined score CS. At step 14, a previous authentication score (AS1 in this example) generates an encryption key that is used to encrypt that combined score to create a dynamic pairing code (DPC). Alternatively, any other previous scores or combination thereof may also be used, in certain embodiments, to generate an encryption key. In some embodiments, a pseudo random number generator is used in conjunction with one or a combination of past authentication scores to generate an encryption key.

Figure 2:
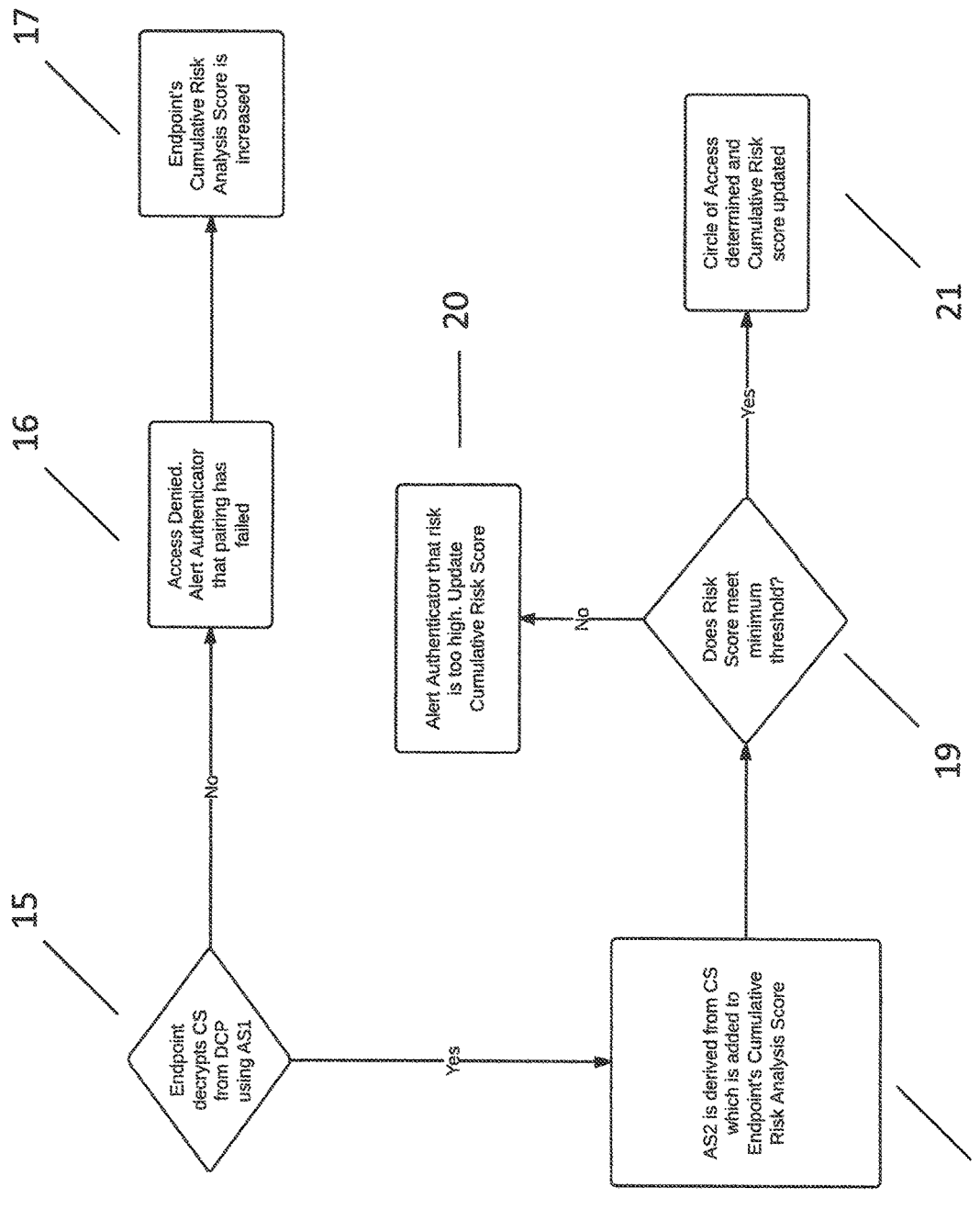
FIG. 2 illustrates the process of decrypting a dynamic pairing code sent from an authenticator.

FIG. 2 depicts a flowchart indicating actions at an endpoint or device that receives the dynamic pairing code as determined at step 14 of FIG. 1. At step 15, the receiving endpoint decrypts the combined score of the dynamic pairing code using the previous authentication score (AS1 in this example) to determine the decrypting key. If the decryption process is successful, processing moves to a step 18 where the new authentication score (AS2) is derived from the combined score. This value is added to this endpoint's cumulative risk analysis score. If the cumulative risk score satisfies a minimum threshold (decision step 19) then the circle of access is determined and the cumulative risk score is updated. If the decision step 19 returns a negative value then an alert is sent to the authenticator that the risk of sending information is too high, whereby, more authentication may be requested. Again, the cumulative risk score is again updated. See step 20.

Returning to the decision step 15, if the decryption process is unsuccessful, access is denied and the authenticator is alerted (step 16). At step 17, the endpoint's cumulative risk score is updated/increased.

Figure 3:
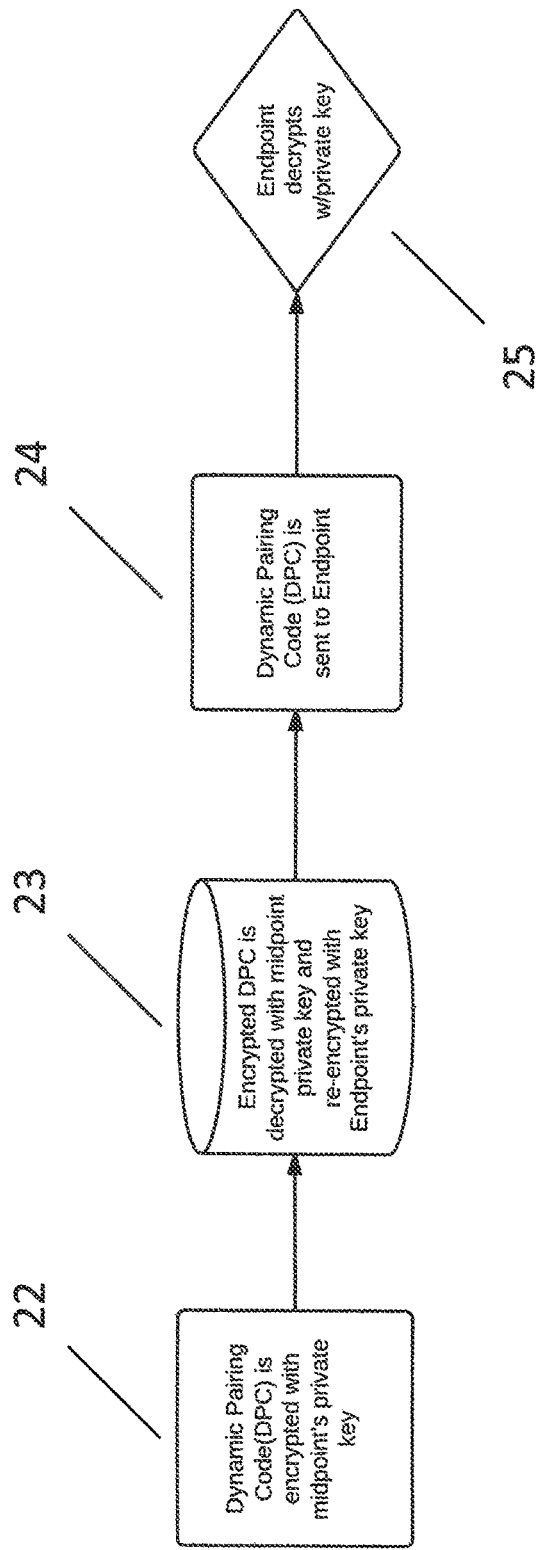
FIG. 3 illustrates an alternative embodiment of the present invention utilizing midpoints for entity identification, additional encryption abilities, and a filter mechanism to prevent invalid authentication requests.

FIG. 3 illustrates an embodiment using a midpoint device. At step 22, the dynamic pairing code is encrypted with the midpoint's private key. At step 23, the pairing code is decrypted with the midpoint's private key and re-encrypted with the endpoint's private key. The pairing code is sent to the endpoint at step 24. At step 25, the endpoint decrypts the pairing code with its private key.

Figure 4:
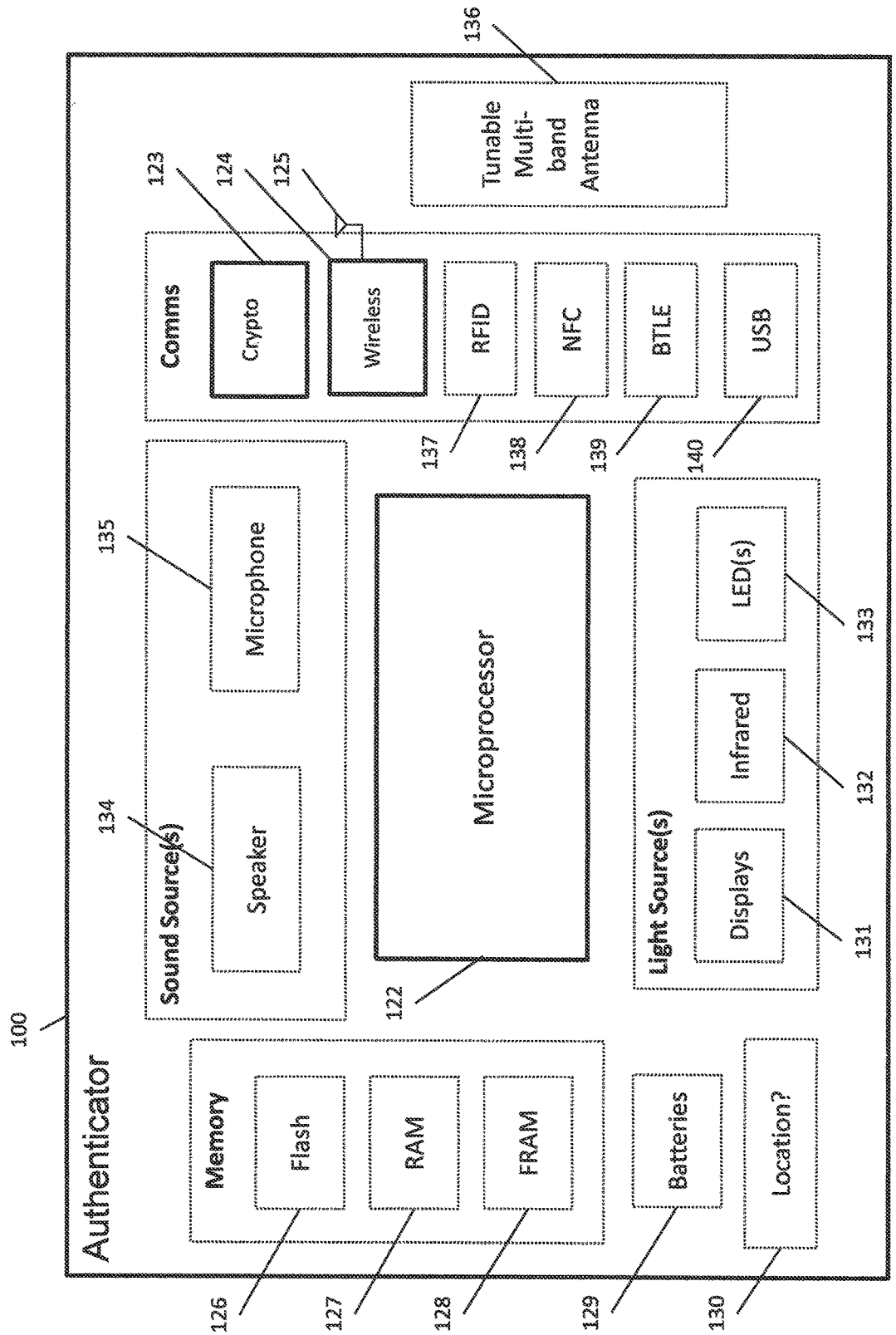
FIG. 4 illustrates a functional block diagram of a universal authentication computing device.

FIG. 4 illustrates a computer architecture in which the principles of the present invention may be employed. The hardware architecture of the various computing devices of the present invention may vary, but generally comprise a microprocessor 122, crypto 123, and wireless communications device 124 and a antenna 125. Crypto 123 in this sense is not simply a component that supports cryptographic encryption and/or decryption, it may also be, in some embodiments, an anti-tamper device.

The authenticator of the present invention, one embodiment of which is illustrated in FIG. 4, may be packaged within any enclosure, including, without limitation, a wallet, ring, bracelet, necklace, watch or another wearable item, a mobile device, a FOB, key ring, key chain, key chain accessory, purse, smart card, identity card, USB, or dongle, all collectively referred to as a package or enclosure.

In addition, the authenticator includes flash memory 126, RAM 127, FRAM 128 and/or other memory devices. Components such as batteries 129 and location devices 130 are also options. In some configurations, displays 131, infrared 132, LEDs 133 and/or other light sources may be installed to support user interfaces and/or light or imagery as a communication method. In other embodiments, a speaker 134 and/or microphone 135 are installed to support sound as a communication method. In yet other embodiments, one or more variable multi-band and/or broadband antennas 136 may be installed to support various inductive data transfers and RF (radio frequency) communication techniques.

Additionally, wireless methods such as WiFi, RFID (Radio Frequency Identification) components 137, NFC (Near Field Communication) components 138, Bluetooth and/or BTLE (Bluetooth Low Energy) components 139 are illustrated in block diagram form for use in communicating to other devices, in some embodiments. Serial methods such as RS-232 and USB (Universal Serial Bus) 140 can also optionally be supported. Other communication technologies known to those skilled in the art can also be supported as needed.

Embodiments are described with reference to the attached figures, wherein like reference numerals are used throughout the figures to designate similar or equivalent elements. The figures are not drawn to scale and they are provided merely to illustrate aspects disclosed herein. Several disclosed aspects are described herein with reference to example applications for illustration only. It should be understood that numerous specific details, relationships, and methods are set forth to provide a full understanding of the embodiments disclosed herein. One having ordinary skill in the relevant art will readily recognize that the disclosed embodiments can be practiced without one or more of the specific details or with other methods. In other instances, well-known structures or operations are not shown in detail to avoid obscuring aspects disclosed herein. Disclosed embodiments are not limited by the illustrated ordering of acts or events, as some acts may occur in different orders and/or concurrently with other acts or events. Furthermore, not all illustrated acts or events are required to implement a methodology in accordance with the embodiments. All examples and exemplary alternatives set forth in the application are merely for illustration and are intended as non-limiting examples and alternatives.

What is claimed is:

1. A method for determining a dynamic pairing code for use in exchanging information between a first and a second communications device, the method comprising:
    determining a plurality of authentication scores or a plurality of risk scores associated with each one of a plurality of information exchanges between the first and second communications devices, each one of the plurality of information exchanges spaced apart in time;
    combining the plurality of authentication scores or the plurality of risk scores to create a cumulative risk analysis score; and
    responsive to the cumulative risk analysis score, generating a dynamic pairing code for use in a subsequent information exchange between the first and second communications devices.

2. The method of claim 1 wherein use of the dynamic pairing code in the subsequent information exchange between the first and second communications devices relates to authentication, authentication risks, encryption, credentials, or access levels for the subsequent information exchange.

3. The method of claim 1 wherein after each information exchange between the first and second communications devices, the method further comprises generating a new cumulative risk analysis score and responsive thereto generating a new dynamic pairing code, the new dynamic pairing code for use during a next information exchange between the first and second communications devices.

4. The method of claim 1 further comprising creating a modified cumulative risk analysis score responsive to additional information exchanges between the first and second communications devices and generating a modified dynamic pairing code responsive to the modified cumulative risk analysis score.

5. The method of claim 1 wherein the step of generating the dynamic pairing code is executed at the first communications device, the method further comprising the encrypting the dynamic pairing code and sending an encrypted dynamic pairing code from the first communications device to the second communications device and decrypting the dynamic pairing code at the second communications device, wherein the first and second communications devices use information derived from the dynamic pairing code in a subsequent information exchange between the first and second communications devices.

6. The method of claim 5 wherein a key for encrypting and decrypting the dynamic pairing code is responsive to an authentication score from a most recent information exchange between the first and second communications devices.

7. The method of claim 1 wherein an authentication score is associated with each information exchange between the first and second communications devices and each authentication score results in an updated cumulative risk score from which an updated dynamic pairing code is generated.

8. The method of claim 1 wherein a most recent authentication score associated with a most recent information exchange between the first and second communications devices is determinable at both the first and second communications devices responsive to the dynamic pairing code associated with the most recent information exchange.

9. The method of claim 1 wherein the dynamic pairing code is embodied in a polynomial.

10. The method of claim 1 wherein the second communications device comprises a plurality of second communications devices each having an authentication score or a risk score associated with an information exchange with the first communications device and based thereon each having a dynamic pairing code for use in governing information exchanges with the first communications device.

11. The method of claim 1 wherein the second communications device comprises a mobile device having communication capabilities or a computing device having communications capabilities.

12. The method of claim 1 each one of the plurality of authentication scores is responsive to one or more of user identifiers and access parameters.

13. The method of claim 1 wherein one or both of the first and the second communications devices comprises a user, a device, an application, a service, a server, or a software application.

14. The method of claim 1 comprising a plurality of access levels, an information exchange between the first and second communications devices governed by one of the plurality of access levels, each access level based on a relationship between the cumulative risk analysis score and a threshold value associated with each one of the plurality of access levels.

15. The method of claim 1 further comprising encrypting the dynamic pairing code, wherein an encryption key for use in encrypting the dynamic pairing code is generated in response to a pseudo-random number and at least one of the plurality of authentication scores or the plurality of risk scores. .

16. The method of claim 1 wherein each one of the plurality of authentication scores is in a polynomial form.

17. The method of claim 1 the dynamic pairing code for use by the first and second communications devices in association with one or more of the following, for carrying out subsequent authentication actions, for determining risk associated with exchanging information between the first and second communications devices, for encrypting information, and for assigning access levels to communications devices.

18. The method of claim 1 further comprising modifying the cumulative risk analysis score responsive to attempts by an intruder to intercept of affect an information exchange between the first and the second communications devices.

19. A method for determining a dynamic pairing code for use in exchanging information between a midpoint communications device disposed on a communications path between a first and a second communications device, the method comprising:
    determining a first plurality of midpoint authentication scores or a first plurality of midpoint risk scores based on a plurality of information exchanges between the first communications device and the midpoint communications device;
    determining a second plurality of midpoint authentication scores or a second plurality of midpoint risk scores based on a plurality of information exchanges between the midpoint communications device and the second communications device;
    combining the first plurality of authentication scores or the first plurality of risk scores to create a first cumulative risk analysis score;
    combining the second plurality of authentication scores or the second plurality of risk scores to create a second cumulative risk analysis score; and
    responsive to the first and second cumulative risk analysis scores, generating a respective first and second dynamic pairing code for use in a subsequent information exchange between the first communications device and the midpoint communications device and between the second communications device and the midpoint communications device.

20. The method of claim 19 the first and second dynamic pairing codes for use by the first, second, and midpoint communications devices in association with one or more of the following, for performing subsequent authentication actions, for determining risk associated with exchanging information between the first, second, and midpoint communications devices, for encrypting information, and for assigning access levels to communications devices.

* * * * *